(12) United States Patent
Brooke et al.

(10) Patent No.: US 7,069,691 B2
(45) Date of Patent: Jul. 4, 2006

(54) HYDROPONICS PLANT CULTIVATION ASSEMBLY FOR DIVERSE SIZES OF POTS AND PLANTS

(75) Inventors: Lawrence L. Brooke, 5636 Thomas Rd., Sebastopol, CA (US) 95472; Brent A. Goetzl, Orinda, CA (US); Keith C. Evans, Forestville, CA (US); Henry Rie, Richmond, CA (US)

(73) Assignee: Lawrence L. Brooke, Sebastopol, CA (US)

( * ) Notice: Subject to any disclaimer, the term of this patent is extended or adjusted under 35 U.S.C. 154(b) by 0 days.

(21) Appl. No.: 10/857,251

(22) Filed: May 27, 2004

(65) Prior Publication Data

US 2005/0274073 A1    Dec. 15, 2005

(51) Int. Cl.
*A01G 31/06* (2006.01)

(52) U.S. Cl. ...................................... 47/59 R
(58) Field of Classification Search ............. 47/1.01 R, 47/18, 39, 59 R, 60, 61, 62 A, 63; 239/398, 239/302, 303, 304
See application file for complete search history.

(56) References Cited

U.S. PATENT DOCUMENTS

| 2,463,719 | A | * | 3/1949 | Schackett et al. .............. 47/75 |
| 2,764,845 | A |   | 10/1956 | Colombini |
| D239,129 | S |   | 3/1976 | Rosenberger |
| D244,471 | S |   | 5/1977 | Cicci |
| 4,059,922 | A | * | 11/1977 | DiGiacinto ..................... 47/82 |
| 4,513,533 | A |   | 4/1985 | Gething et al. |
| 4,788,792 | A |   | 12/1988 | Womick |
| 5,094,060 | A | * | 3/1992 | Caird ........................... 53/390 |
| 5,228,229 | A | * | 7/1993 | Lindgren ....................... 47/39 |
| 5,440,836 | A |   | 8/1995 | Lee |
| 5,502,923 | A | * | 4/1996 | Bradshaw ................... 47/62 A |
| 5,896,701 | A |   | 4/1999 | Schaerer |
| 2002/0005011 | A1 |   | 1/2002 | Goldberg et al. |
| 2005/0011118 | A1 | * | 1/2005 | Umbaugh, Jr. ................. 47/61 |
| 2005/0274824 | A1 | * | 12/2005 | Brooke et al. .............. 239/398 |

FOREIGN PATENT DOCUMENTS

CH           641323 A5 *  2/1984
GB          2137464 A  * 10/1984

* cited by examiner

*Primary Examiner*—Francis T. Palo
(74) *Attorney, Agent, or Firm*—Nordman, Cormany et al; Kenneth J. Hovet

(57) ABSTRACT

Disclosed is a hydroponic assembly for planting pots of diverse sizes. The assembly is formed of a reservoir having a top and bottom with an opening in said top; a support frame disposed in said opening; a first and a second insert supported by said frame. The first insert has a first access port and the second insert has a second access port with a different size than the first.

12 Claims, 8 Drawing Sheets

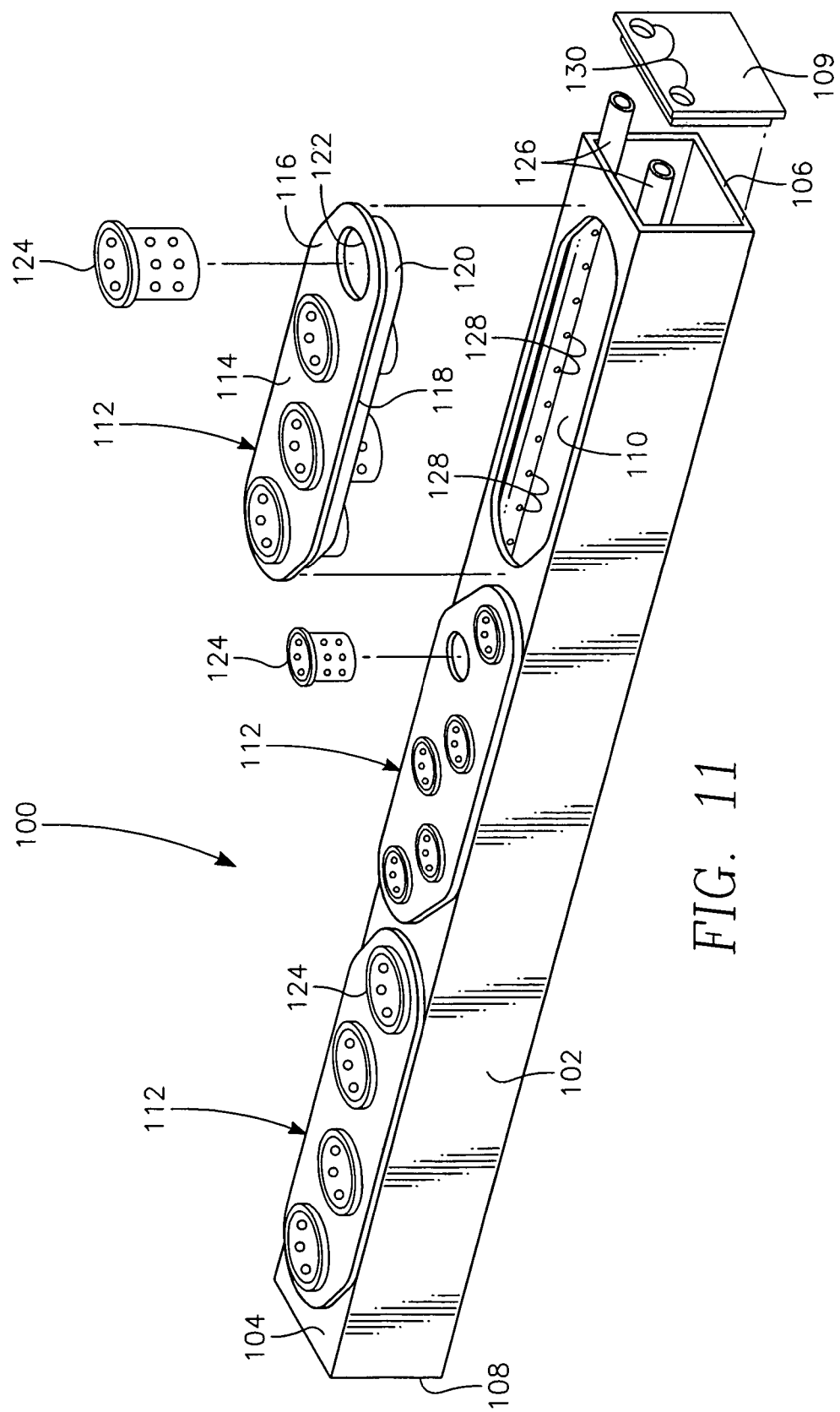

HYDROPONICS PLANT CULTIVATION ASSEMBLY FOR DIVERSE SIZES OF POTS AND PLANTS

BACKGROUND OF THE INVENTION

1. Field of the Invention

The present invention pertains generally to horticultural apparatuses. More particularly, the present invention pertains to a hydroponics assembly for cultivating plants.

2. Description of Related Art

Hydroponic assemblies have long been used to sprout and cultivate plants, including vegetables, flowering plants, and novelty plants such as Venus-Fly-Traps, among others, in a soil-less environment. Trees may also be initially cultivated in hydroponic systems, but typically have to be transferred to a more permanent soil environment before growing to an unwieldy size.

Hydroponic assemblies not only provide an alternative growing means in regions lacking an abundance of soil, but can be used year-round in indoor green-houses. Additionally, transplanting plants cultivated in soil typically requires some cutting of healthy roots and otherwise inflicting trauma on the plant. In hydroponic cultivation, because the roots of a plant are suspended in a non-permanent media, such as gravel, transfer is typically less traumatic to the plant, and may be accomplished with little or no damage to the roots.

Because hydroponic assemblies are ideal for many different kinds of plants, many horticulturists seek to grow multiple kinds of plants. Different types of plants, however, grow at different rates, and to different sizes. In the past, this has required the purchase and installation of multiple, separate hydroponic assemblies, a particularly burdensome requirement both in terms of expense and space, especially for a home or amateur horticulturist.

U.S. Pat. No. 4,513,533 to Gething et al. is directed to a method and apparatus for hydroponic farming. The patent describes a tank or raceway in which a plurality of styrofoam rafts float on the surface of an aqueous nutrient medium.

U.S. Pat. No. 2,764,845 to Colombini is directed to a planter that consists of pairs of similarly formed and interchangeable wall sections of knockdown construction adapted to be assembled to form a receptacle or box adapted to receive plants or the like, and a support structure therefor.

U.S. Pat. No. 5,440,836 to Lee is directed to a hydroponic device that includes a reservoir.

U.S. Pat. No. 5,896,701 to Schaerer is directed to a hydroponic cultivation receptacle comprising a tray having a board upon which to place seeds of small vegetables like sprouts.

There remains a need for an assembly for the hydroponic cultivation of various sized plants while minimizing the expense and space normally associated with the purchase and use of multiple hydroponic units. The present invention satisfies this objective and provides further related advantages.

SUMMARY OF THE INVENTION

Now in accordance with the invention, there has been found an assembly for the hydroponic cultivation of various sized plants, while eliminating the need to utilize multiple hydroponic units. The present invention further allows a horticulturist to vary the selection of plants being cultivated, including kind and size, through use of a hydroponic assembly having removable and interchangeable members.

An assembly for hydroponic cultivation of plants in diverse sizes of planting pots comprises a reservoir having a top and bottom. An opening is formed in the reservoir top and a support frame is disposed in the opening. According to one embodiment, the support frame is removable from the frame. In another embodiment, the support frame includes an inner hub, an outer rim, and, a plurality of radial support members coupling the inner hub to the outer rim. The outer rim can be round or polygonal. In some embodiments, a dowel disposed between the support frame and the bottom of the reservoir acts to support the weight imposed on the frame.

First and second inserts are supported by the frame. The support frame defines a plurality of support zones, such that the first insert is advantageously upheld by one support zone, and the second insert is upheld by a different support zone. In preferred embodiments, the inserts can be removed from the frame.

In some embodiments, each insert includes a rigid planar sheet with first and second surfaces. And in some embodiments, a peripheral skirt extends about perpendicularly from the first surface of a rigid planar sheet, and follows a path a predetermined distance from the periphery of the rigid planar sheet. The peripheral skirt stabilizes an insert within its respective support zone.

The first insert has a first access port, and the second insert has a second access port with a different size than the first access port. A first planting pot can be placed in the first access port and a second planting pot can be placed in the second access port. In some embodiments, the first planting pot has a plurality of irrigation holes, and growth media is contained within the first planting pot. And in some embodiments, a portion of the first planting pot extends into the reservoir. In other embodiments, the first access port is circumscribed by a skirt extending into the reservoir. In one embodiment, the first insert has a support brace beneath the bottom of the skirt for supporting the first planting pot. And according to one embodiment, the first insert has a plurality of access ports.

In some embodiments, the inventive assembly for hydroponic cultivation of plants in diverse sizes of planting pots includes a reservoir having a top and bottom with a plurality of openings in the top. A first insert having a first access port and a second insert having a second access port are supported by the reservoir, where the first access port is of a different size than the second access port.

Particular embodiments of the invention are described below in considerable detail for the purpose of illustrating the principles of operation. However, various modifications may be made and the scope of the invention is not limited to the exemplary embodiments described below.

BRIEF DESCRIPTION OF THE DRAWINGS

The novel features of this invention will be best understood from the accompanying drawings, taken in conjunction with the accompanying description, in which similar characters refer to similar parts, and in which:

FIG. 11 is an exploded isometric view of a fourth embodiment of a hydroponic assembly according to the present invention.

DESCRIPTION OF THE PREFERRED EMBODIMENTS

Figure 1:
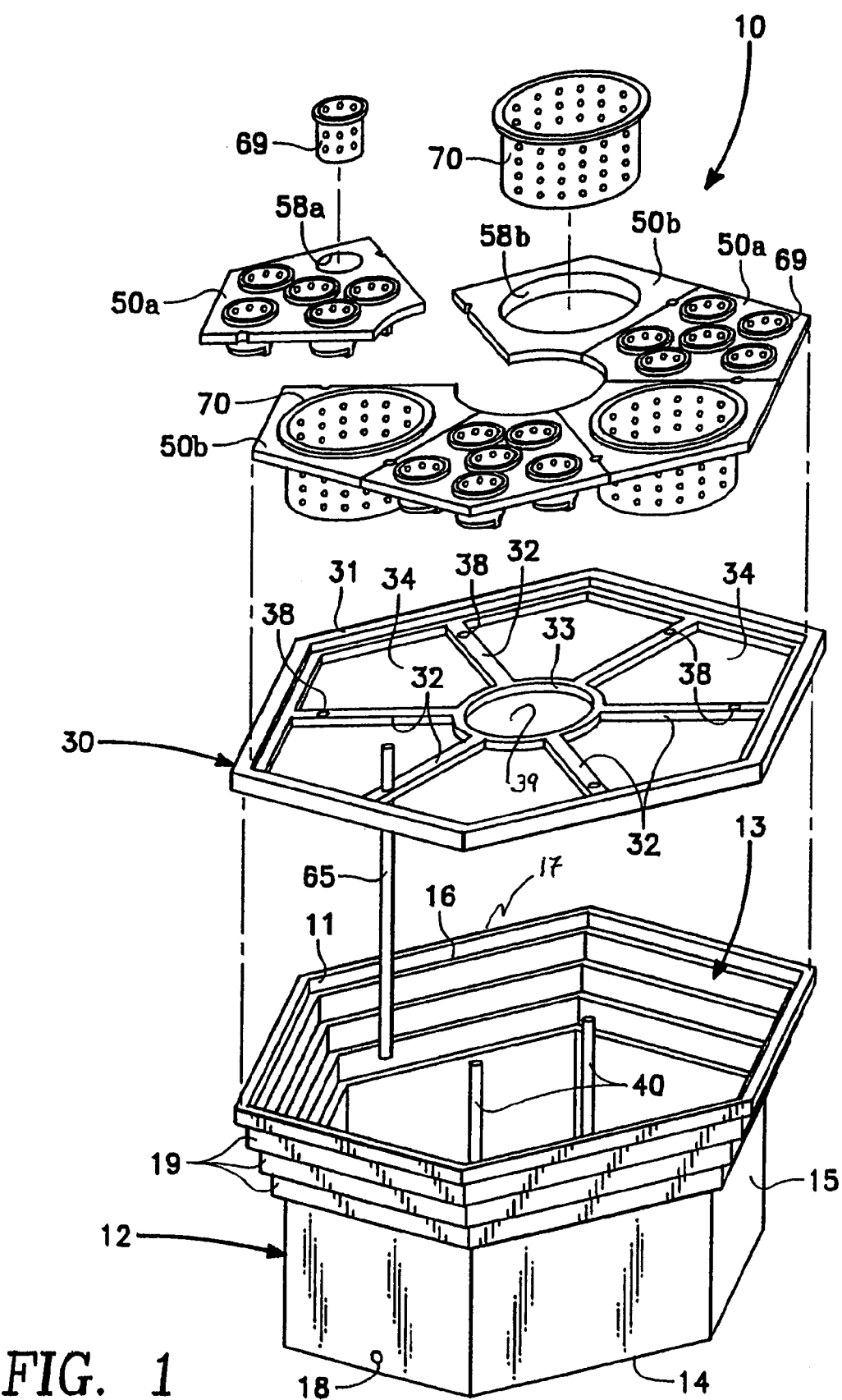
FIG. 1 is an exploded isometric view of a first embodiment of a hydroponic assembly according to the present invention.

Referring now to FIG. 1, there is shown an assembly 10 for the hydroponic cultivation of plants in diverse sizes of planting pots in accordance with the invention. The assembly includes a reservoir 12 having a top 11 and bottom 14 with an opening 13 in the top. Additionally, the reservoir includes a plurality of rigid sidewalls 15, and a ledge 16 formed along the periphery of the sidewalls just below the opening 13.

FIG. 1 is a hexagonal unit having six sidewalls 15. The hexagonal shape of the reservoir opening is exemplary, and embodiments are envisioned using other polygonal shapes, as well as circular and elliptical shapes. The exemplary sidewalls of FIG. 1 are formed with successive steps 19, thereby enhancing the strength of the reservoir.

In some embodiments, a drain hole 18 is formed in a sidewall 15 near the bottom 14 of the reservoir 12. The drain hole allows the reservoir to be easily drained, and also allows the reservoir to act as a feed source for water being siphoned into another hydroponic assembly.

Figure 2:
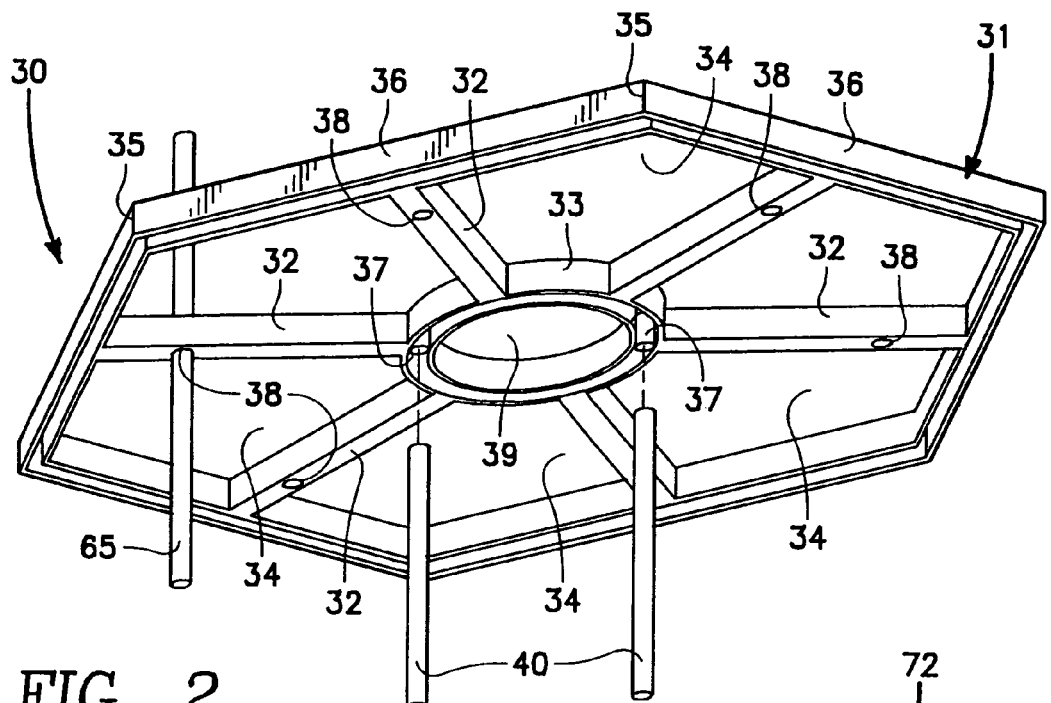
FIG. 2 is a bottom isometric view of a support frame of FIG. 1.

In the first embodiment shown in FIG. 1, a support frame 30 is disposed in the opening 13. The support frame defines a plurality of support zones 34. As seen in FIGS. 1 and 2, the support frame 30 includes an outer rim formed of six perimeter support members 31 joined end to end to form a hexagonal perimeter of the frame. The rim of the frame is shaped to fit within the opening 13 of the reservoir 12, and to rest on the ledge 16 formed on the inner sidewalls 15 of the reservoir. The hexagonal rim is held in place by a lip 17 formed of a portion of the sidewalls extending above the ledge 16.

The frame 30 also includes a circular inner hub 33 defining an inner opening 39. Six radial support members 32 have a first end engaged to the hub 33 and a second end engaged to a respective perimeter support member 31 thereby defining the six support zones 34 within the frame.

As seen in FIG. 2, each radial support member 32 intersects a respective perimeter support member 31 at mid-point 36 between the first and second end of a respective perimeter support member. In an alternative embodiment, is the radial support members may intersect the rim at a joint 35 connecting adjacent perimeter support members. In another alternative embodiment, the support frame may be configured as a grid rather than the hub-and-spoke type shown. Moreover, the support zones 34 defined by a frame need not be equal in size.

Two upper dowel guides 37 are formed on the lower surface of the inner hub 33. The upper dowel guides are aligned with two dowel guides (not shown) formed on the upper surface of the bottom of the reservoir 12. The dowel guides secure corresponding support dowels 40 in a fixed position. The dowels 40 have a first end that fits within a corresponding dowel guide 37 in the inner hub 33, and a second end that fits in the corresponding dowel guide in the bottom of the reservoir. The dowels 40 function to strengthen and support the frame 30. The cylindrical shape of the dowels 40 and guides 37 is exemplary, and alternative shapes for dowels and their corresponding guides are envisioned. The location of the dowel guides within the inner hub is also exemplary, and dowel guides can be formed at any location deemed advantageous for supporting the frame 30.

A tube guide 38 illustrated as a round bore is formed in at least one radial support member 32. The shape and location of the tube guide are exemplary, and one or more tube guides may be formed at any location through the various frame members. A variety of tubes 65, including, but not limited to depth gauges, nutrient feed tubes, siphons, and temperature gauges can be inserted through the tube guides and into the reservoir 12.

Returning to FIG. 1, multi capacity modular inserts 50a and/or single capacity modular inserts 50b can be inserted into a respective support zones, such that the inserts are supported by the frame. In the first embodiment shown in FIG. 1, the periphery of each of six inserts 50 is identical in size and shape, allowing them to be interchangeably placed in any of the support zones 34.

The support frame 30 bears the weight of the inserts 50, as well as any planting pots 69, 70 within a particular insert. In the embodiment shown in FIG. 1, the size and shape of each insert is determined by the size and shape of the support zones 34 formed by the frame 30.

Figure 3:
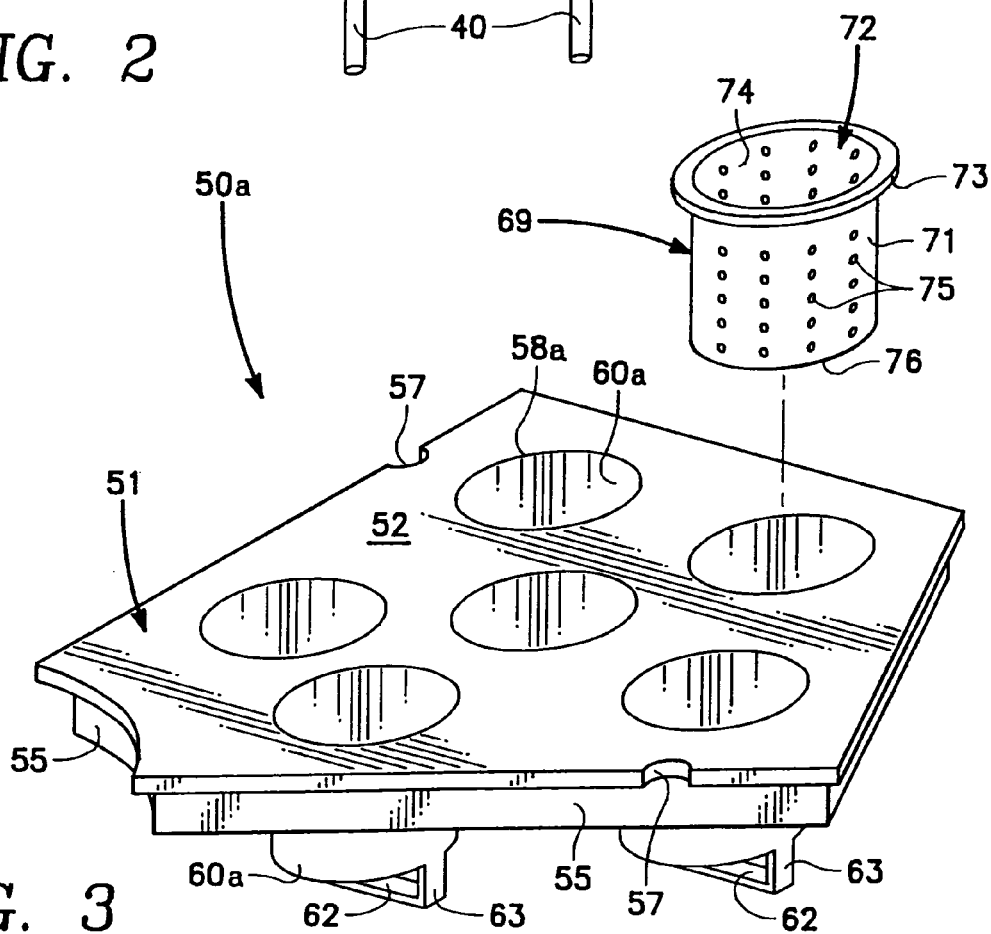
FIG. 3 is an exploded top isometric view of a portion of an insert of FIG. 1 with a plurality of access ports and a planting pot.
Figure 4:
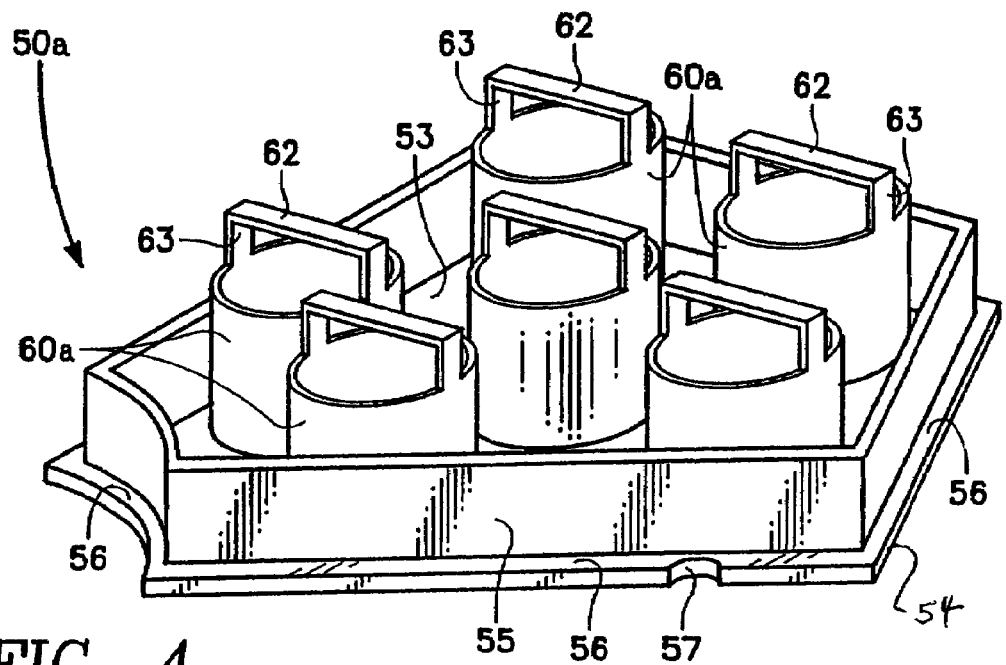
FIG. 4 is a bottom isometric view of the portion of the insert of FIG. 3.
Figure 6:
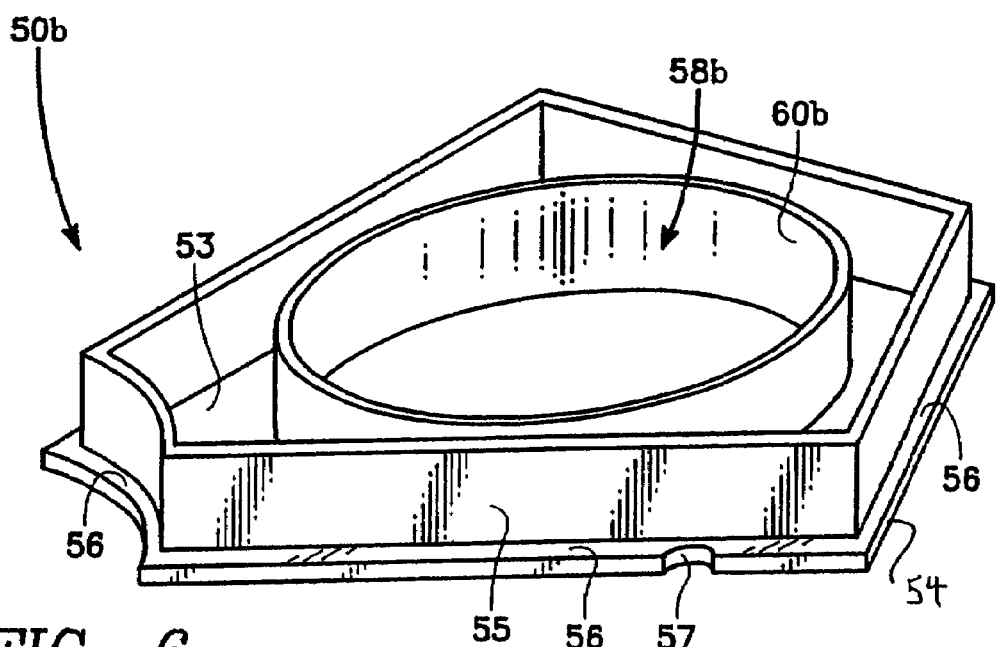
FIG. 6 is a bottom isometric view of the portion of the insert of FIG. 5.
Figure 5:
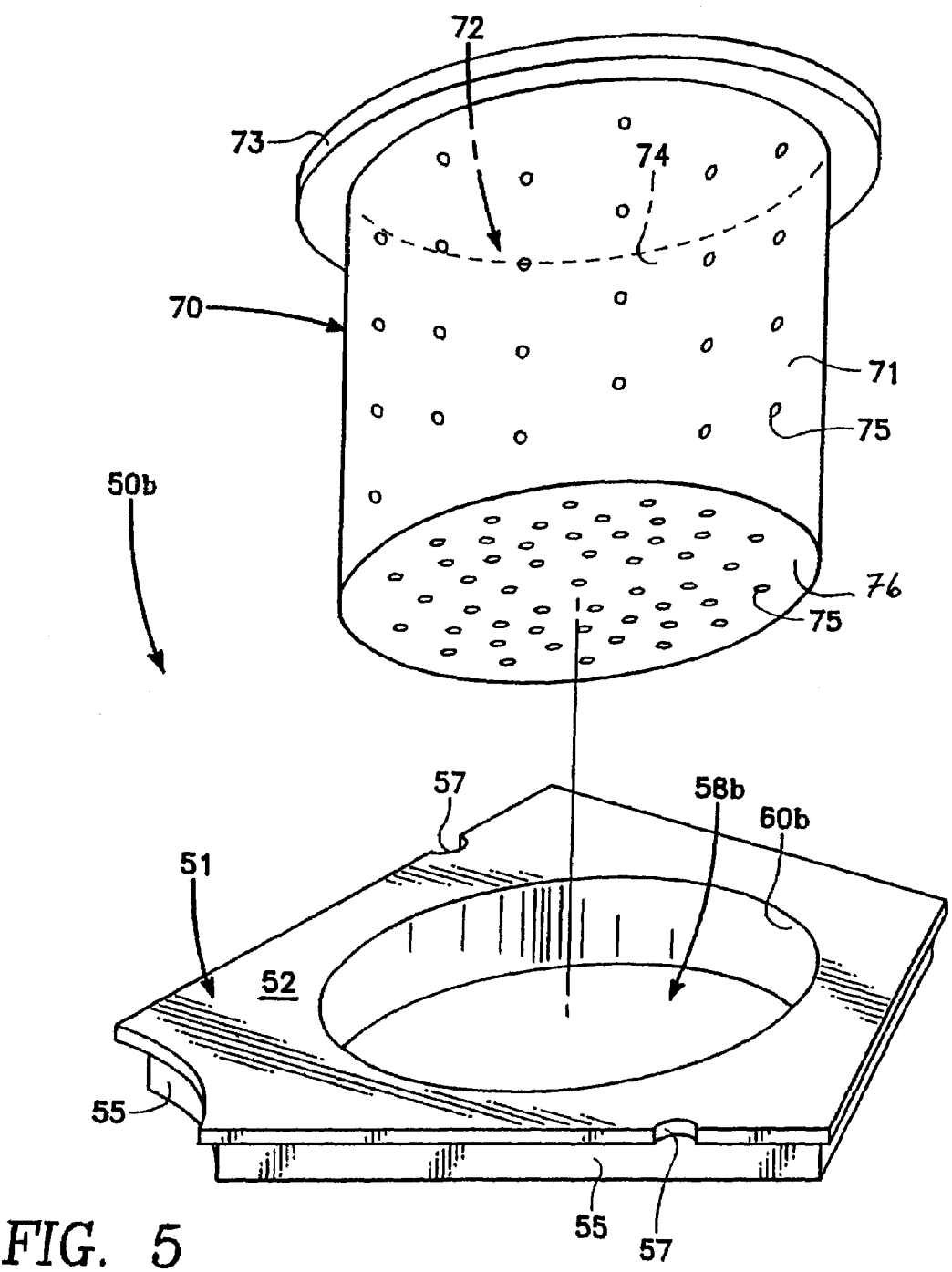
FIG. 5 is a top isometric view of a portion of an insert of FIG. 1 having a single access port and a single planting pot.

FIGS. 3–6 show in greater detail the features of the inserts 50a,b. Each insert includes a rigid planar sheet 51 having a top surface 52, as shown in FIGS. 3 and 5, and a bottom surface 53, as shown in FIGS. 4 and 6. A peripheral skirt 55 extends from the bottom surface 53 at a right angle, just inside the periphery 54 of the insert, thereby following the path of the insert periphery. The peripheral skirt is dimensioned to mate with the sides of a support zone. The bottom surface 53 outside the peripheral skirt 55 forms a support ledge 56 that rests on the frame once the peripheral skirt 55 is inserted into a support zone 34. As a result, the peripheral skirt 55 functions to orient an insert within a support zone and to prevent the insert from shifting or falling through the zone. The shape of the inserts 50a,b of FIGS. 3–6 conforms to the zones 34 formed by the hub-and-spoke frame of FIG. 2. Differently shaped inserts would be formed to conform with alternative frame designs.

Semicircular indentations 57 are formed at adjacent locations along the periphery 54 of the inserts, such that the indentation on the peripheries of adjacent inserts together form a tube opening when the inserts are in place. The tube openings are aligned with the corresponding tube guides 38, thereby allowing a tube such as a depth monitor to be inserted through adjacent indentations 57 on adjacent inserts 50, through the tube guide 38 within the frame 30, and into the reservoir. It is understood that the size, shape and location of the indentations 57 are exemplary, and positioned in FIGS. 3–6 to conform with the exemplary size, shape and location of the tube guide 38 formed in the frame.

Each insert 50 has at least one access port 58 for holding a planting pot 69, 70, such that a portion of the planting pot is within the interior of the reservoir 12, but is supported in a manner such that it cannot fall into the reservoir 12. The access ports 58 shown in the figures have different diameters. A greater number of smaller diameter access ports may be formed in a single insert, as exemplified with the ports 58a of FIGS. 3 and 4, whereas a fewer number of larger diameter access ports can be formed in an insert, as exemplified in the access port 58b of FIGS. 5 and 6.

Access port skirts 60a, 60b are advantageously formed around each of the respective access ports 58a, 58b, extending downward from the bottom surface 53 of the planar sheet 51. The access port skirts serve to guide a planting pot at a proper angle, to secure the pots as water from a sprayer impacts the planting pots, and to strengthen the insert 50 against the weight of the planting pots. The access port skirts 60a, 60b of FIGS. 3–6 define a conical frustum to secure planting pots having a corresponding frusto-conic shape. Alternatively, the access port skirt may have a cylindrical or polygonal shape in conformity with other designs of planting pots. In still other embodiments, the access ports have no skirt at all.

As best seen in FIG. 4, access ports 58a are formed with a support brace 62 extending horizontally below the bottom end of the access port skirt 60a, and coupled to the skirt by support arms 63. The support brace 62 prevents a planting pot from falling through an access port. The support arms 63 are long enough to ensure that some of the planting pot hangs below the skirt 60a and is exposed to the interior of the reservoir 12.

In use, planting pots are inserted into respective access ports. As variously illustrated in FIGS. 1, 3, and 5, planting pots include "thin wall" planting pots 69, 70 which can be made from plastic, glass, ceramic, pottery, or other rigid materials. The "thin-wall" planting pots have a rigid sidewall 71 with an opening 72 at the top, and a bottom 76. The sidewalls are illustrated as defining a conical frustum in accord with the shape of the access port skirts 60a, 60b of FIGS. 3–6. The upper diameter of a planting pot 69, 70 is advantageously sized such that it fits snugly in the access port skirt 60. According to this design, the planting pot fits snugly into the access port when the planting pot is fully inserted.

The planting pots 69, 70 are advantageously formed with a rim 73 surrounding the opening 72. The rim 73 is preferably larger in diameter than the access port 58 into which the planting pot is being inserted, thereby preventing the planting pot from falling into the reservoir 12 of the hydroponic assembly 10. According to the embodiment of FIG. 5, the rim is the primary means of supporting the planting pot 70. However, as seen in the embodiment of FIG. 3, the rim is optional as the access port 60a includes a support brace 62 for supporting the planting pot.

Each thin-wall planting pot 69, 70 has a plurality of irrigation holes 75. In use, the cavity 74 of the thin-wall planting pots are filled with a growth media such as dirt, "rockwool," coconut fiber, clay pebbles, moss, gravel, peat, or any other suitable growing media for supporting root growth of plants.

Figure 7:
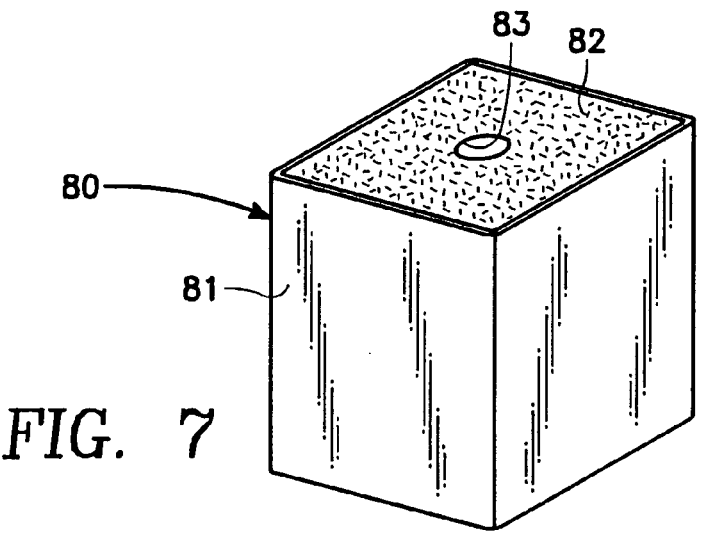
FIG. 7 is an isometric view of a solid growth media, drip cube-type planting pot for use in conjunction with the unit of FIG. 1.

FIG. 7 shows an alternative embodiment of a planting pot, commonly known as a "drip cube" 80. A semi-rigid cube of growth media 82 has a small cavity 83 for seeds, and is wrapped by a plastic liner 81. Drip cubes 82 are advantageously comprised of shredded organic material compressed into a solid porous unit. Solid growth media planting pots can be formed from a variety of materials including rockwool and coconut fiber. Through various manufacturing techniques, the material is formed into a solid porous mass, such as a cubic or conic shape. In cultivation, the roots of a plant enmesh with the fibers of the solid growth media 82. The growth media and liner together form the "sidewall" of this type of planting pot. Instead of irrigation holes discussed above, the top and bottom sides of the cube are not wrapped in liner, and water can drip straight through the cube. Growth media can be formed from any of the above discussed materials, as well as other suitable materials.

Figure 8:
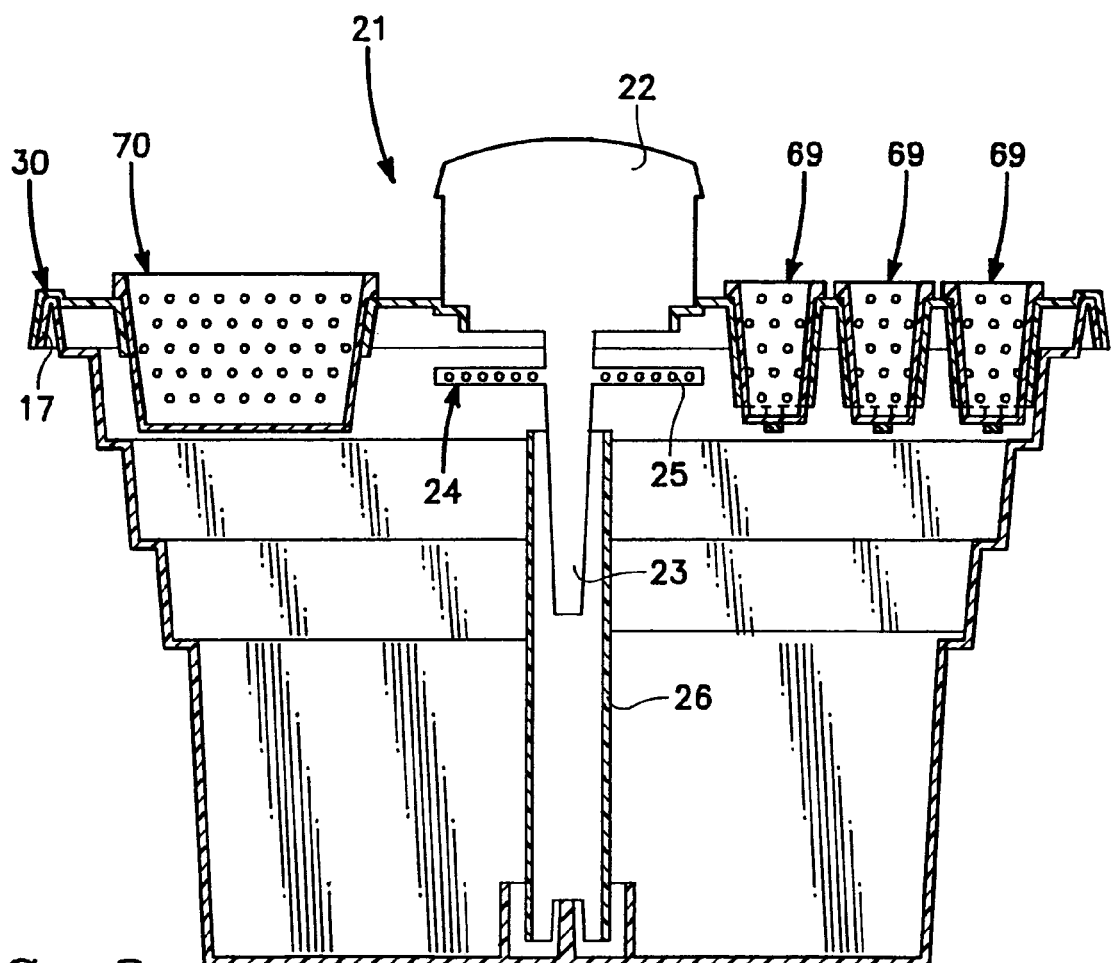
FIG. 8 is a cross section side elevational side view of a first embodiment of the hydroponic assembly of FIG. 1 additionally including a centrifugal pump.

As seen in FIG. 8, various sizes of thin-wall planting pots 69, 70 are supported by the frame 30 of the unit. The lower portion of the planting pots 69, 70 are within the reservoir 12 and horizontally adjacent the sprayer head 24. Water discharged from the spray outlets 25 enters the irrigation holes 75 on the sides of the pots, and drains out irrigation holes 75 which may be formed on the bottom 76. Plant roots within the planting pots thereby receive a regulated spray of water and nutrients contained therein.

FIG. 8 additionally illustrates a second embodiment utilizing a sprayer assembly 21 including a rotating shaft 23 coupled to a motor 22, and to a spray head 24. Water is centrifugally forced up the rotating shaft 23 and into the sprayer head 24, from which it is discharged through spray outlets 25. To prevent roots from becoming entangled in the rotating shaft 23, a root protector 26 such as a sheath or tube is placed around the rotating shaft 23.

Figure 9:
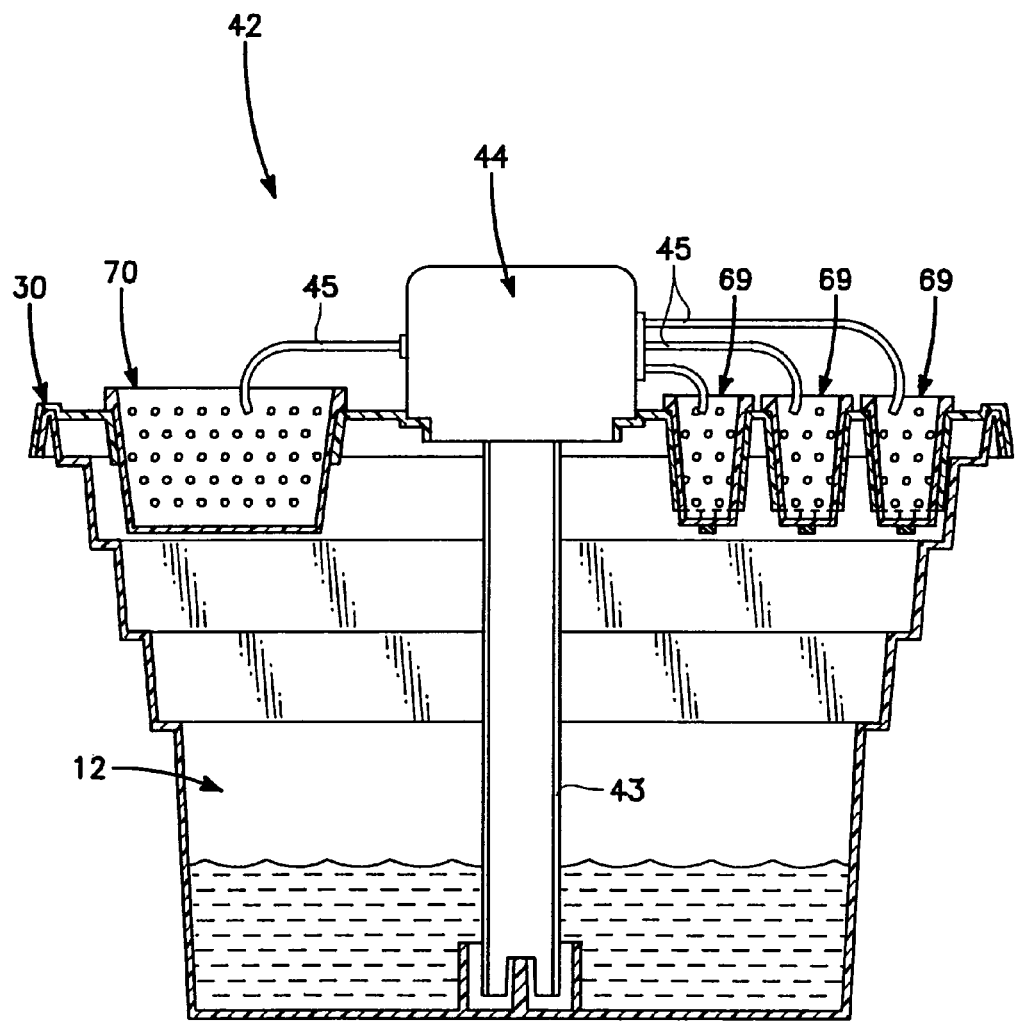
FIG. 9 is a side elevational view of a second embodiment of a hydroponic assembly of FIG. 1 additionally including an automated drip watering system.

It is an advantage of the inventive assembly that it is suitable for use with a automated watering system 42 or a siphon-type drip watering system 48. FIG. 9 illustrates an automated drip watering system 42 comprising the reservoir 12 with a pump 44 for drawing water from a feed hose or shaft 43 and discharging the water through a plurality of individual drip hoses 45 leading to the respective planting pots 69, 70.

Figure 10:
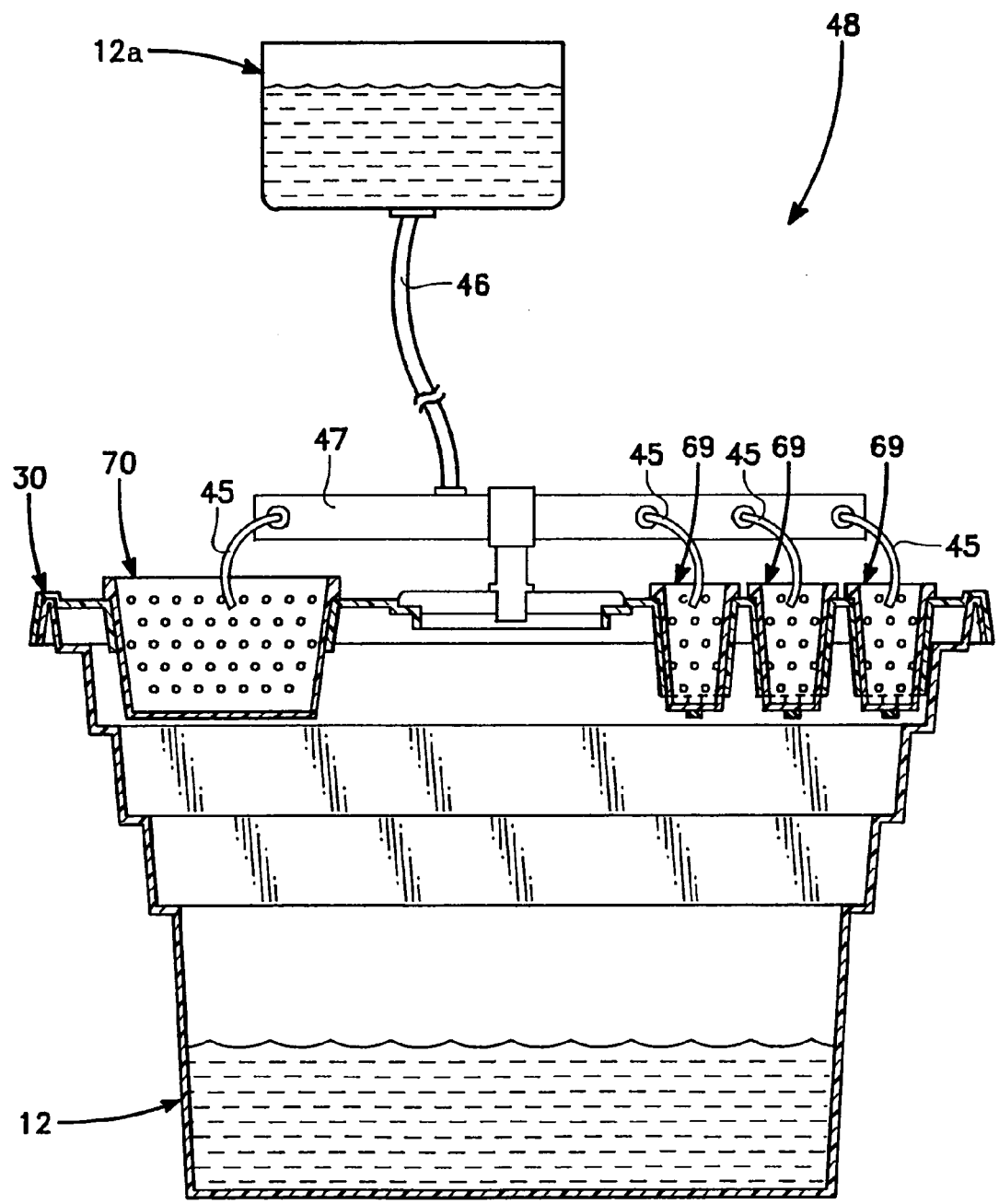
FIG. 10 is a side elevational view of a third embodiment of a hydroponic assembly of FIG. 1 additionally including a siphon-type drip watering system.

FIG. 10 illustrates a third embodiment assembly having a siphon-type watering system 48 wherein fluid in a second reservoir 12a is positioned above the reservoir 12. Fluid is siphoned through a siphon tube 46 and distributed by a manifold 47 to individual drip hoses 45 directed to the respective planting pots 69, 70.

Turning to FIG. 11, there is shown a fourth embodiment assembly 100 for the hydroponic cultivation of plants in diverse sizes of planting pots in accordance with the invention. The assembly includes a reservoir 102 having a top 104, a bottom 106, and a plurality of rigid sidewalls 108. A plurality of openings or support zones 110, of the same size and shape, are formed in the top 104. The reservoir can be made of any suitable material, for example, of a rigid thermoplastic material.

A plurality of modular inserts 112 are configured to be inserted into respective support zones 110. The size and shape of each insert is determined by the size and shape of the support zones formed in the reservoir. In the embodiment shown in FIG. 11, the periphery of each of three inserts is identical in size and shape, allowing them to be interchangeably placed in any of the support zones.

Each insert 112 includes a rigid planar sheet 114 having a top surface 116 and a bottom surface 118. A peripheral skirt 120 extends from the bottom surface at a right angle, just inside the periphery of the insert, thereby following the path of the insert periphery. The peripheral skirt is dimensioned to mate with the sides of a support zone 110. The bottom, surface 118 extending laterally beyond the peripheral skirt forms a support ledge that rests on the reservoir once the peripheral skirt is inserted into a support zone. As a result, the peripheral skirt functions to orient an insert within a support zone and to prevent the insert from shifting or falling through the zone.

Each insert 112 has at least one access port 122 for holding a planting pot 124, such that a portion of the planting pot is within the interior of the reservoir 102, but is supported in a manner such that it cannot fall into the reservoir. The access ports 122 have different diameters. A greater number of smaller diameter access ports may be formed in a single insert, whereas a fewer number of larger diameter access ports can be formed in an insert.

The embodiment shown in FIG. 11 includes a pair of spray tubes 126 secured to the interior of the reservoir 102 and extending the length of the reservoir, one on each side of the access ports 122. The spray tubes contain a plurality of perforations 128, positioned so that as water is caused to travel the length of the spray tubes, a spray is directed at the planting pots 124.

A pair of water inlets 130 formed in the end wall 109 proximate one end of the spray tubes 126 provides for a fluid connection between the spray tubes and a water source (not shown). A drain hole (not shown) is formed in one of the sidewalls 108 near the bottom of the reservoir 102.

Within the foregoing description, many specific details commonly understood by those skilled in the art have not been recited so as to not needlessly obscure many of the essential features of the present invention. In other instances, many details that are not essential to the operation of the present invention have been recited in the detailed description and figures to better illustrate the claimed invention, and to better enable the reader to make and use the same. On the contrary, the appended claims are fully intended to include alternative designs, modifications, and equivalents consistent with the spirit and scope of the invention described herein.

We claim:

1. An assembly for hydroponic cultivation of plants in diverse sizes of planting pots comprising:
   a. a reservoir having a top and bottom with an opening in said top;
   b. a support frame disposed in said opening, said support frame including an inner hub, an outer rim and a plurality of radial support members coupling said inner hub to said outer rim;
   c. at least a first and a second insert supported by said frame, said first insert having a first access port, and said second insert having a second access port; and,
   d. a first planting pot disposed within said first access port, and a second planting pot disposed within said second access port, said first and second planting pots containing a growth media and having a lower portion with a plurality of irrigation holes, said lower portion extending into said reservoir below each corresponding insert.

2. The assembly of claim 1 wherein at least said first access port is circumscribed by a skirt extending into said reservoir.

3. The assembly of claim 2 wherein said first insert has a support brace beneath the bottom of said skirt.

4. The assembly of claim 1 further comprising a sprayer having:
   a) a sprayer head with spray passages for directing water toward said lower portion of at least said first and second planting pots.

5. The assembly of claim 1 wherein each insert includes a rigid planar sheet with first and second surfaces, and a peripheral skirt extending about perpendicularly from said first surface, said peripheral skirt located a predetermined distance from the periphery of the rigid planar sheet.

6. The assembly of claim 5 wherein the first insert has a first indentation and the second insert has a second indentation adjacent the first indentation, thereby forming a tube opening.

7. The assembly of claim 6 wherein said support frame has at least one tube guide, said tube opening being aligned with said tube guide.

8. The assembly according to claim 7 further comprising a tube inserted within said tube opening and said tube guide.

9. The assembly according to claim 1 further comprising a dowel disposed between the support frame and the bottom of the reservoir.

10. The assembly according to claim 1 wherein the support frame is removable from said opening.

11. An assembly for hydroponic cultivation of plants in diverse sizes of planting pots comprising:
    a. a reservoir having an enclosed top and bottom;
    b. said top having at least a first and second opening and at least a first and a second insert supported by a corresponding first and second opening; said first insert having a first access port, and said second insert having a second access port;
    c. a first pot extending into said first access port and a second pot extending into said second access port, each of said first and second pots containing a growth media consisting of any one or combination of a member selected from the group consisting of dirt, rock wool, coconut fiber, clay pebbles, moss, gravel and peat; and,
    d. said first and second pots each having irrigation openings and at least a lower portion extending into said reservoir.

12. The assembly of claim 4 wherein said sprayer includes:
    a. a sprayer shaft with a first end coupled to the sprayer head and a second end extending into said reservoir;
    b. a sprayer motor operatively coupled to the sprayer head; and,
    c. a root protector encompassing a portion of the sprayer shaft.

* * * * *